Sept. 13, 1932.  F. E. NEWTON  1,877,632

SCREW SHAVING AND SLOTTING MACHINE

Filed May 29, 1931 2 Sheets-Sheet 1

INVENTOR
Frank E. Newton
by Harry R. Williams
atty.

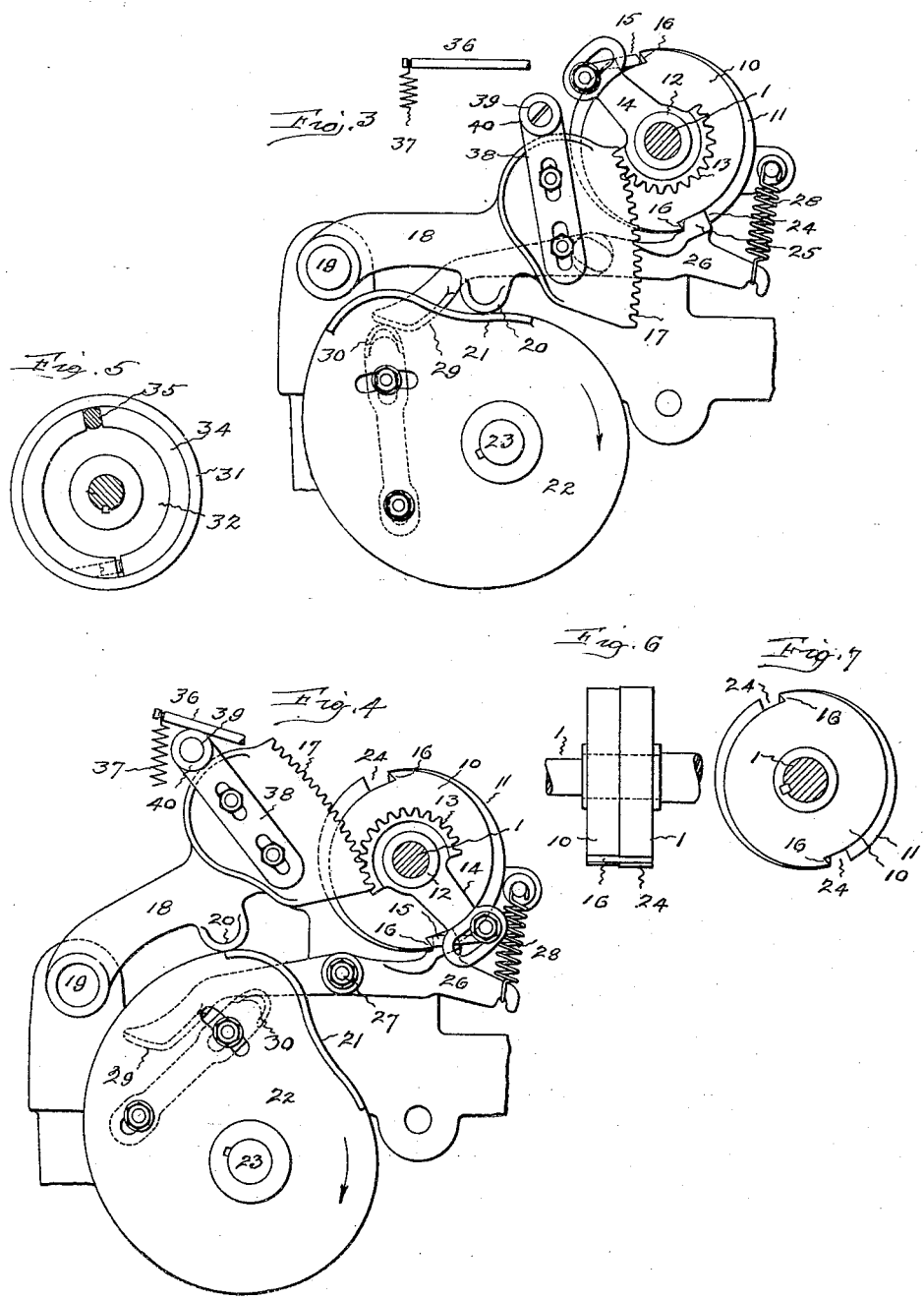

Patented Sept. 13, 1932

1,877,632

UNITED STATES PATENT OFFICE

FRANK E. NEWTON, OF HARTFORD, CONNECTICUT

SCREW SHAVING AND SLOTTING MACHINE

Application filed May 29, 1931. Serial No. 540,934.

This invention relates more particularly to the type of machines which have two rotatable chuck spindles that are mounted on an intermittently rotated shaft, the blanks being fed to a chuck carried by the spindle that is in the position in which the heads are shaved, then given a half revolution with that spindle to a position in which the heads are slotted and then given a half revolution back to shaving position in which the burrs caused by the slotter are removed and the blanks discharged.

The object of the invention is to provide means for so controlling the turning movements of the shaft which carries the spindles that the machine may be operated very rapidly and produce accurate blanks with a minimum expenditure of power and small wear on the controlling members.

In attaining this object braking means are arranged so as to be applied to the shaft near the end of each semi-revolutionary movement, in such manner as to gradually overcome the momentum of the rapidly revolved heavy spindles and their supporting and rotating means, as they finish their movements, and ensure the engagement of the positive indexing means, without applying friction to the shaft during its entire rotation, thus enabling the machine to be operated faster with fewer defective blanks and with less driving power and destructive wear on the parts, than with the previously constructed machines of this type.

Figure 1:
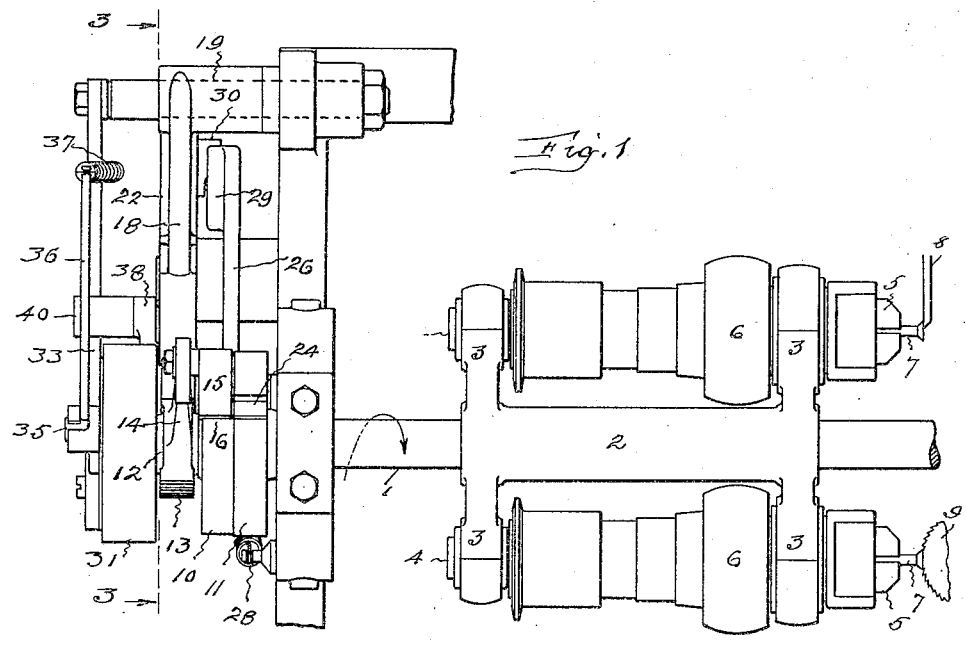
Figure 2:
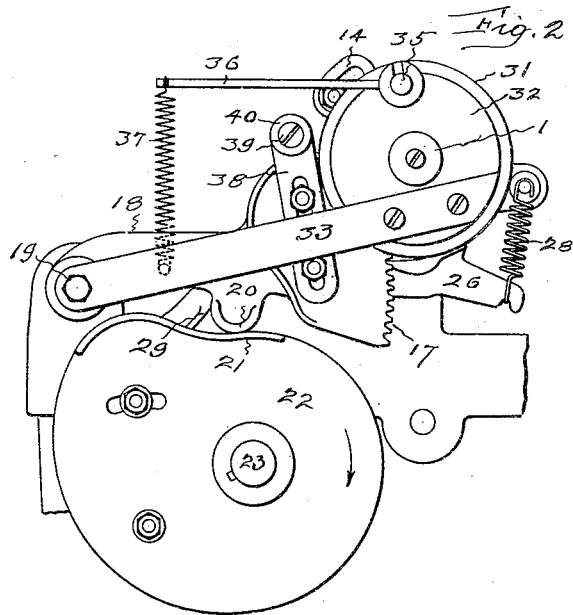

In the accompanying drawings Fig. 1 shows a plan of so much of a screw shaver and slotter of the type referred to as is necessary to an understanding of the present invention. Fig. 2 shows an end elevation of the same. Fig. 3 shows a transverse section on the plane indicated by the dotted line 3—3 on Fig. 1, with the parts in one position. Fig. 4 shows a transverse section on the same plane with the parts in a different position. Fig. 5 shows the clutch with the cover plate removed. Fig. 6 shows an edge view of the drive disk and the index disk. Fig. 7 shows a face view of the drive and index disks.

The shaft 1 is rotatably supported in the usual manner common to these machines. Fastened to the shaft and turning therewith is a sleeve 2 with arms 3 which carry rotatable spindles 4 that are provided with chucks 5, and pulleys 6 by means of which the spindles are rotated. When the spindles are in one position the blanks 7, which the chucks carry are presented to a shaving tool 8, and when in the other position the blanks are presented to a saw 9 by which they are slotted, Fig. 1.

Fastened to the shaft are a drive disk 10 and an index disk 11. Turning loosely on the shaft is a sleeve 12 that has a toothed segment 13 and an arm 14. Adjustably secured to the outer end of this arm is a pawl 15 that is designed to engage the shoulders 16 on the periphery of the drive disk 10.

Meshing with the segment 13 is a toothed segment 17 on a lever 18 that is pivoted on a stud 19 which is supported at the rear of the machine frame. The segment lever 18 has a projecting boss 20 that rides on the cam 21 a projecting boss 20 that rides on the cam 21 on the periphery of the cam disk 22 which is fastened to the main cam shaft 23 of the machine. The rotation of this cam through the medium of the lever and intermeshing toothed segments, at the required intervals, causes the pawl 15 to engage the shoulder 16 and turn the drive disk and the shaft 180°, and then return.

Adapted to engage notches 24 in the periphery of the index disk 11 is a tooth 25 on the end of a lever 26 which is mounted on a stud 27 fastened to the frame. A spring 28 connected between the outer end of this lever and the frame tends to hold the tooth in engagement with the periphery of the index disk 11. The inner end of this lever has a shoe 29 that is adapted to be engaged by the end of a cam block 30 which is adjustably fastened to the cam disk 22. This cam block at the proper intervals engages the lever 26 and withdraws the tooth 25 from a notch in the periphery of the index disk so that the pawl 15 may rotate the drive disk and shaft. At the end of the push of the pawl the spring 28 pulls the lever so that the tooth will project into a notch and stop the rotation of the shaft with the spindles in proper position.

The mechanism described causes a very rapid rotation of the shaft and consequently gives the spindles a quick revolving movement, and previously it frequently happened that, owing to the speed and momentum of the parts, the index tooth would not enter the notch of the index disk and the shaft would turn too far thus disturbing the timing relations of the mechanisms and producing defective articles. To overcome this and ensure the entry of the tooth into the notch of the disk, without applying excessive resistance in order to overcome the momentum of the spindles, their supports and the shaft, the female member 31 of a split ring clutch is fastened to the shaft while the male member 32 of the clutch is held from rotation by an arm 33 which is mounted on the stud 19. Between these clutch members is an expansion ring 34 the sections of which at the proper time are spread by the oblong inner end of a stud 35 that projects through the fixed member of the clutch and between the ends of the split ring. This expansion stud has a projecting stem 36 that is drawn down by a spring 37 connected with the arm 33 which holds the non-rotating clutch member, so as to normally hold the clutch free. Adjustably fastened to the segment lever 18 is an arm 38 with a projecting stud 39 which carries a roll 40 in the plane of the clutch stem 36.

This arm is so adjusted that as the segment nears the end of its upward movement, the roll 40 will engage the stem 36 and turn the stud 35. This causes the expansion of the clutch ring so that the clutch will slow down the rotation of the shaft as it approaches the completion of its rotary movement and stop the shaft at the right time. This braking of the rotation of the shaft relieves the parts of the pound or jar which would result from the inertia of the revolved spindles if they were stopped suddenly, and also slows down the shaft near the end of its movement in such manner that the tooth which indexes the rotatory members will surely enter a notch in the index disk and hold the shaft and the parts which it carries in exact position for the tools to properly act upon the blanks held by the chucks carried by the spindles.

The invention claimed is:

1. In combination with a shaving and slotting machine which has a rotatory shaft carrying rotatory stock-holding spindles, means for imparting intermittently rotary movements to the shaft, means for locking said shaft in exact position at the end of each movement, braking means for slowing down and stopping the rotatory movement of the shaft, and means engaged by the means for imparting said intermittently rotary movements to the shaft for applying said braking means as the shaft approaches the limits of its rotatory movements.

2. In combination with a shaving and slotting machine which has a rotatory shaft carrying rotatory stock-holding spindles, means for imparting intermittently rotary movements to the shaft, means for locking said shaft in exact position at the end of each movement, a friction clutch with one member attached to said shaft, and means for closing said clutch as the shaft approaches the limits of its rotatory movements.

3. In combination with a shaving and slotting machine which has a rotatory shaft carrying rotatory stock-holding spindles, means for imparting intermittently rotary movements to the shaft, means for locking said shaft in exact position at the end of each movement, braking means for slowing down and stopping the rotatory movement of the shaft, and means actuated by the shaft rotating means for applying said braking means as the shaft approaches the limits of its rotatory movements.

4. In combination with a shaving and slotting machine which has a rotatory shaft carrying rotatory spindles, a ratchet wheel and pawl for imparting intermittently rotary movements to the shaft, means including tooth segments and a cam for oscillating said pawl, means for locking said shaft in exact position at the end of each movement, said locking means being released by the action of said cam, braking means for slowing down and stopping the rotatory movement of the shaft, and means carried by one of said segments for applying said braking means as the shaft approaches the limits of its rotatory movements.

5. In combination with a shaving and slotting machine which has a rotatory shaft carrying rotatory spindles, a ratchet wheel and pawl for imparting intermittently rotary movements to the shafts, means including toothed segments and a cam for oscillating said pawl, means for locking said shaft in exact position at the end of each movement, said locking means being released by the action of said cam, a friction clutch with one member attached to said shaft, and means carried by the pawl oscillating means for closing said clutch as the shaft approaches the limits of its rotatory movements.

6. In combination with a shaving and slotting machine which has a rotatory shaft carrying rotatory spindles, a ratchet wheel and pawl for imparting intermittently rotary movements to the shaft, toothed segments and a cam for oscillating said pawl, a toothed lever for locking said shaft in exact position at the end of each movement, a spring for causing the engagement of said locking means, means on said cam for causing the release of said locking means, a friction clutch with one member rotatable with the shaft and a member held against rotation, and an arm movable with said toothed segments for closing said clutch as the shaft approaches the limits of its rotatory movements.

7. In combination a rotatory shaft having a ratchet disk, a notched index disk and a clutch member fixed on the shaft and a toothed segment loose on the shaft, a pawl carried by said segment for engaging the ratchet disk, a lever with a tooth engaging the index disk, a fixed clutch member concentric with the shaft, an oscillatory toothed segment engaging the segment on the shaft, a cam for oscillating said segments, means on said cam for disengaging said toothed lever from the index disk, and means on said second mentioned segment for causing the engagement of said clutch members as the shaft approaches the limits of its rotatory movements.

FRANK E. NEWTON.